United States Patent [19]
Nakano et al.

[11] Patent Number: 5,861,681
[45] Date of Patent: Jan. 19, 1999

[54] OCCUPANT CRASH PROTECTION DEVICE FOR A VEHICLE

[75] Inventors: Takashi Nakano; Tamotsu Tominaga, both of Omiya, Japan

[73] Assignee: Kansei Corporation, Omiya, Japan

[21] Appl. No.: 838,067

[22] Filed: Apr. 18, 1997

Related U.S. Application Data

[63] Continuation-in-part of Ser. No. 648,964, May 17, 1996, abandoned.

[30] Foreign Application Priority Data

May 19, 1995 [JP] Japan ................................. 7-121397
Jul. 28, 1995 [JP] Japan ................................. 7-193419

[51] Int. Cl.⁶ ............................................... B60R 21/32
[52] U.S. Cl. ..................... 307/10.1; 180/271; 180/272; 280/728.1; 280/734; 701/45
[58] Field of Search .................... 307/9.1, 10.1; 180/268, 271, 272, 274, 282; 280/728.1, 734, 735; 701/36, 45

[56] References Cited

U.S. PATENT DOCUMENTS

| | | | |
|---|---|---|---|
| 5,081,442 | 1/1992 | Ito | 280/734 |
| 5,166,880 | 11/1992 | Furui | 280/735 |
| 5,204,547 | 4/1993 | Schumacher et al. | 307/10.1 |
| 5,309,030 | 5/1994 | Schultz | 307/10.1 |
| 5,311,065 | 5/1994 | Kondo | 280/735 |
| 5,539,610 | 7/1996 | Williams | 307/10.7 |
| 5,554,890 | 9/1996 | Kinoshita | 307/10.1 |

FOREIGN PATENT DOCUMENTS 4-500641 2/1992 Japan.

OTHER PUBLICATIONS

Wrathall, Robert S.; "The Design of A High Power Solid State Automotive Switch in CMOS–VDMOS Techonology"; IEEE 16th Power Electronics Specialist Conf., pp. 229–233, 1985.

*Primary Examiner*—Jeffrey A. Gaffin
*Assistant Examiner*—Peter Ganjian
*Attorney, Agent, or Firm*—Foley & Lardner

[57] ABSTRACT

An occupant crash protection device for a vehicle has: a current limiting circuit which receives a supply of a trigger signal generated when it is judged that a significant accident happens, and which controls a squib firing current to have a constant amount; a squib; and a mechanical acceleration switch, the current limiting circuit, the squib, and the acceleration switch being connected in series between terminals of a direct current power source. In the device, the current limiting circuit has: a first n-channel field effect transistor which is connected in series to the squib; a second n-channel field effect transistor which is connected in parallel to the first n-channel field effect transistor and which receives a minute amount of a current obtained by shunting the squib firing current which is to flow through the first n-channel field effect transistor; and bias control means for, in synchronization with the squib firing current, comparing the amount of the current flowing through the second n-channel field effect transistor with a reference amount, and controlling a gate voltage so that the amount of the current flowing through the first n-channel field effect transistor has an amount proportional to the reference amount.

4 Claims, 8 Drawing Sheets

OCCUPANT CRASH PROTECTION DEVICE FOR A VEHICLE

This application is a continuation-in-part of application Ser. No. 08/648,964, filed May 17, 1996 now abandoned.

BACKGROUND OF THE INVENTION

1. Field of the Invention

The invention relates to an occupant crash protection device for a vehicle which causes an air bag to instantly inflate in the case of a crash of a vehicle, thereby protecting occupants from being damaged.

2. Description of the Related Art

A conventional occupant crash protection device for a vehicle will be described with reference to Japanese Patent National Publication No. HEI 4-500641 shown in FIG. 7.

Figure 7:
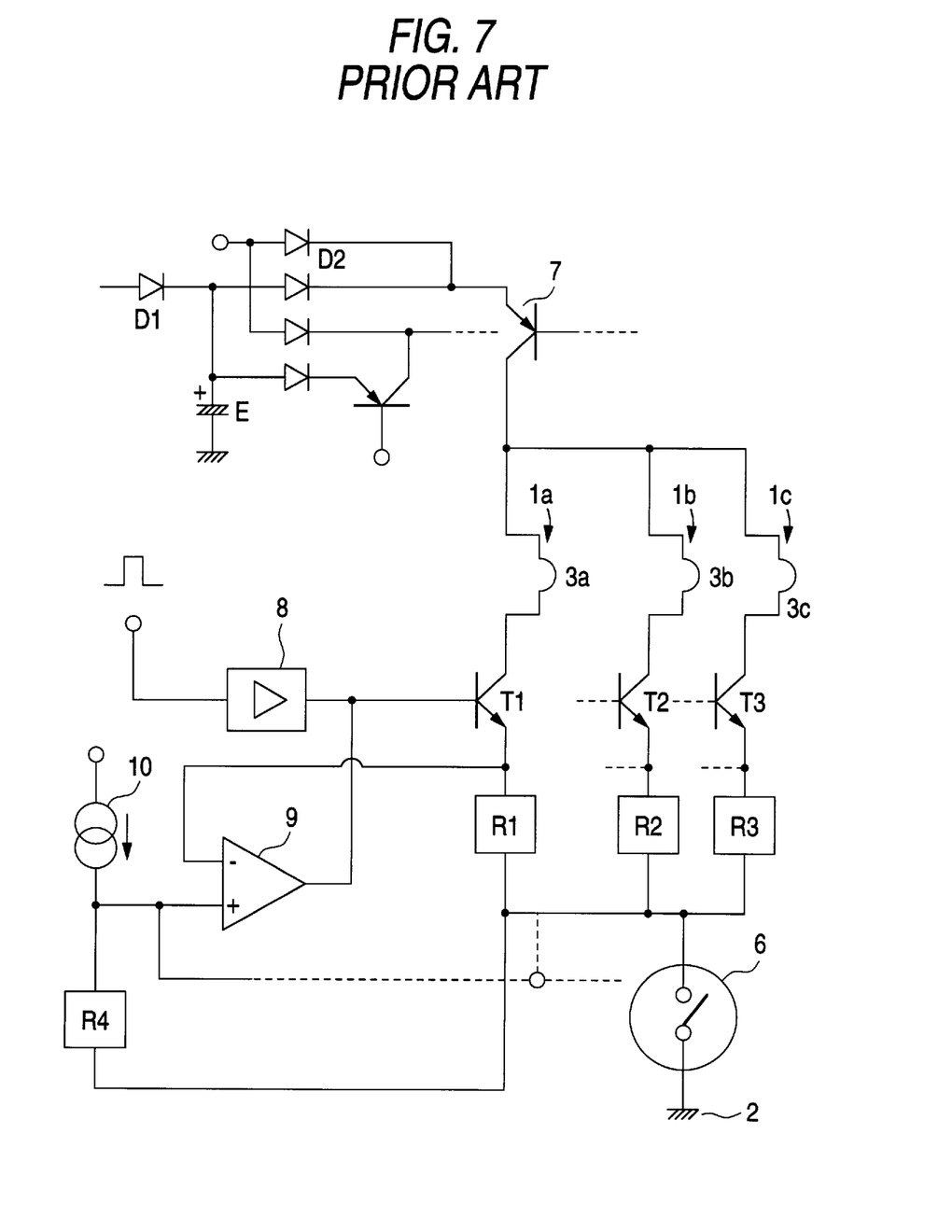
FIG. 7 is a circuit diagram showing a conventional occupant crash protection device for a vehicle.

Referring to FIG. 7, a plurality of squib firing circuits 1a, 1b, and 1c are connected in parallel between a regulated battery voltage UBatt (not shown) and a ground 2 of a battery mounted on a vehicle. The squib firing circuits 1a, 1b, and 1c include squibs 3a, 3b, and 3c which are connected in series to power transistors T1, T2, and T3 and low resistors R1, R2, and R3, respectively. A known mechanical or electrical acceleration switch 6 is connected between the ground 2 and the common junction of the three resistors R1, R2, and R3 which are connected in parallel.

Since the turn on/off operation of the acceleration switch 6 is conducted in response to deceleration of the vehicle, the switch 6 is closed only when deceleration (or negative acceleration) which is greater than a predetermined value occurs (for example, such as that which may occur in a crash). In the conventional example, therefore, the single acceleration switch 6 is commonly used for the three squib firing circuits 1a, 1b, and 1c. The three squibs 3a, 3b, and 3c are connected to the regulated battery voltage Ubatt (not shown) via a series circuit of a monitor switch 7 and diodes D1 and D2. The diodes D1 and D2 protect the circuits when the battery is connected in an incorrect manner or in the opposite polarity. The circuits are individually tested via the monitor switch 7 so as to check whether the circuits operate normally or not.

The occupant crash protection device is activated when an accident occurs and an acceleration sensor (not shown) operates so that the power transistors T1, T2, and T3 are operated simultaneously or in a synchronized manner via a driver circuit 8 to which a squib firing signal is supplied, and a high voltage output circuit. In this case, when deceleration acting from the outside on the vehicle is sufficiently large and greater than a predetermined level, the acceleration switch 6 is closed so that the current from a single energy storage capacitor E flows through the squibs 3a, 3b, and 3c, thereby causing air bags (not shown) corresponding to the squibs 3a, 3b, and 3c to inflate.

In order to limit the currents flowing through the squibs 3a, 3b, and 3c to a predetermined level, the voltages appearing at the terminals of the resistors R1, R2, and R3 which are connected in series to the squibs 3a, 3b, and 3c are supplied to the inverting (−) input terminals of comparators 9 (in the figure, only one comparator is shown) which function as squib firing current limiting devices, respectively. A constant current is supplied via a resistor R4 from a constant current source 10 to which a stabilized voltage UStab is supplied, whereby a reference voltage is supplied to the noninverting (+) input terminals of the comparators 9. When the voltages of the inverting (−) input terminals of the comparators 9 are higher than the reference voltage supplied to the noninverting (+) input terminals (i.e., the squib firing currents flowing through the resistors R1, R2, and R3 are larger than the predetermined level), the comparators 9 output a control signal to the bases of the respective transistors T1, T2, and T3. This causes the amounts of the collector-emitter currents of the power transistors T1, T2, and T3, i.e., the currents flowing through the squibs 3a, 3b, and 3c are lowered to an acceptable level.

In the above-described occupant crash protection device for a vehicle, however, a resistor of a large allowable power must be connected in series to each of the squibs so that the level of the squib firing current is directly detected. This produces a problem in that the power loss is increased and the capacitance of a backup capacitor must be increased by the value corresponding to the increased power loss.

The currents flowing through the power transistors T1, T2, and T3 and the resistors R1, R2, and R3 are large in amount. For example, a squib firing current of about 2 amperes flows through such an element. When, in order to miniaturize the device, the driver circuit 8, the comparators 9, the power transistors T1, T2, and T3, the resistors R2, R2, and R3, etc. are to be integrated into an IC, therefore, the circuit arrangement must be conducted in view of the amount of generated heat, so that the circuits are not affected by the generated heat, with the result that the IC must have a large-scaled structure for heat radiation. This produces problems in that the production cost is increased, and that the device has large dimensions and hence cannot be practically used.

SUMMARY OF THE INVENTION

The invention has been conducted in view of the circumstances, and therefore an object of the invention is to provide a circuit in which the power consumption is low and a reduced amount of heat is generated, and which can be easily integrated.

The occupant crash protection device for a vehicle according to the invention, comprises: a current limiting circuit which receives a supply of a trigger signal generated when it is judged that a significant accident happens, and which controls a squib firing current to have a constant amount; a squib; and an acceleration switch, the current limiting circuit, the squib, and the acceleration switch being connected in series between terminals of a direct current power source. In the device, the current limiting circuit comprises: a first n-channel field effect transistor which is connected in series to the squib; a second n-channel field effect transistor which is connected in parallel to the first n-channel field effect transistor and which receives a minute amount of a current obtained by shunting the squib firing current which is to flow through the first n-channel field effect transistor; and bias control means for, in synchronization with a squib firing signal, comparing the amount of the current flowing through the second n-channel field effect transistor with a reference amount, and controlling a gate voltage so that the amount of the current flowing through the first n-channel field effect transistor has an amount proportional to the reference amount.

According to the invention, the major portion of the squib firing current to be supplied to the squib flows through the first n-channel field effect transistor, and the remaining or minute current flows through the second n-channel field effect transistor which is connected in parallel to the first n-channel field effect transistor. The amount of the current which corresponds to that of the squib firing current is detected via a resistor of a small allowable power which is connected in series to the second n-channel field effect transistor. The detected current amount is compared with the reference amount, and the gate voltage of the first n-channel field effect transistor is controlled so that the turn-on state or the squib firing current is controlled.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

Now, a description will be given of embodiments of the present invention with reference to the accompanying drawings. In the figures, components identical with or equivalent to those of the conventional example shown in FIG. 7 are designated by the same reference numerals and their detailed description is omitted.

(First Embodiment)

Figure 1:
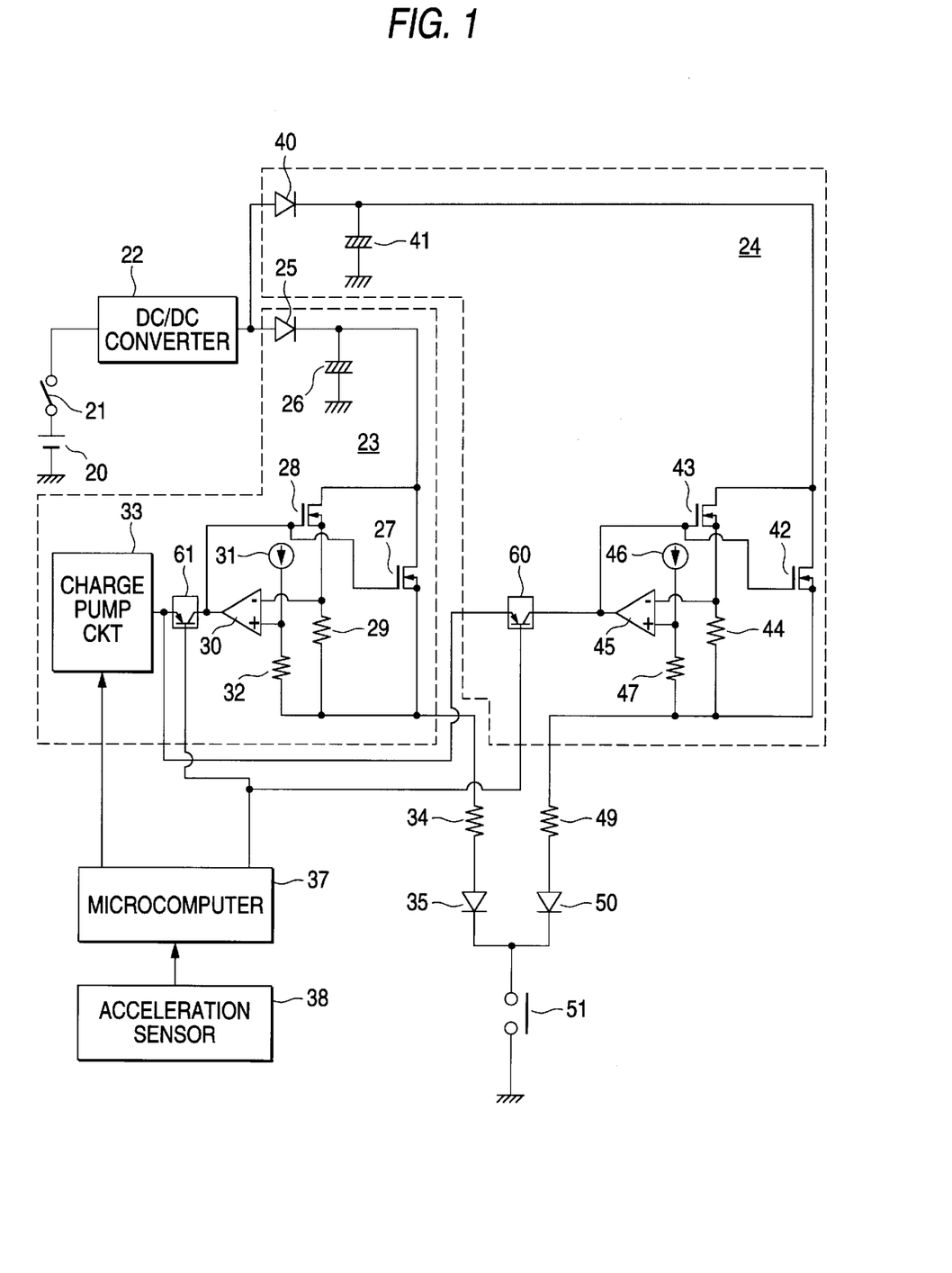
FIG. 1 is a circuit diagram showing an occupant crash protection device for a vehicle in accordance with a first embodiment of the invention.

Reference numeral 20 designates a battery mounted on a vehicle, 21 designates a squib firing switch, and 22 designates a DC/DC converter that boosts the output voltage of the battery 20 and outputs the boost voltage. Reference numerals 23 and 24 designate squib control circuits which perform the same function and are configured identically or equivalently. Specifically, a counterflow preventing diode 25 corresponds to a counterflow preventing diode 40, a backup capacitor 26 to a backup capacitor 41, a first field effect transistor 27 to a first field effect transistor 42, a second field effect transistor 28 to a second field effect transistor 43, a current detection resistor 29 to a current detection resistor 44, a comparator 30 to a comparator 45, a constant current source 31 to a constant current source 46, a resistor 32 to a resistor 47, and a charge pump circuit 33 to a charge pump circuit 48. The squib control circuits 23 and 24 are connected in parallel to the output terminal of the DC/DC converter 22.

Hereinafter, only the squib control circuit 23 will be described. The squib control circuit 24 has the same configuration as the squib control circuit 23 except that the charge pump circuit 33 (which is commonly used for both the circuits 23 and 24) is not provided. Therefore, the description of the circuit 24 is omitted.

Reference numeral 25 designates a counterflow preventing diode, and 26 designates a backup capacitor which is charged by the DC/DC converter 22. Reference numeral 27 designates a first field effect transistor of the n-channel MOS type having a large capacity. A drain of the transistor 27 is connected to the backup capacitor 26, and a source to a squib 34 which will be described later. A current of about 2 amperes which corresponds to the major portion (for example, 99%) of the squib firing current to be supplied to the squib 34 flows through the transistor 27. Reference numeral 28 designates a second n-channel field effect transistor which has a small capacity and which is used for shunting the current flowing through the first field effect transistor 27. A drain of the transistor 28 is connected to the drain of the first field effect transistor 27, and a source to the source of the first field effect transistor 27 via the current detection resistor 29 of a small allowable power. Only a minute current of several milliamperes (corresponding to the remaining portion, for example, 1%, of the squib firing current to be supplied to the squib 34) flows through the second field effect transistor 28.

Reference numeral 30 designates a comparator. A reference voltage produced by the constant current source 31 and the resistor 32 which are connected in series to each other is supplied to the noninverting (+) input terminal of the comparator 30, and the voltage appearing at the current detection resistor 29 is supplied to the inverting (−) input terminal. An output terminal of the comparator 30 is connected to an output terminal of a switch circuit 61 and the gates of the first and second field effect transistors 27 and 28. According to this configuration, when the in put voltage is lower than the reference voltage, the comparator 30 outputs a signal of a high level, and, when the input voltage is higher than the reference voltage, the comparator 30 outputs a signal of a low level.

Figure 2:
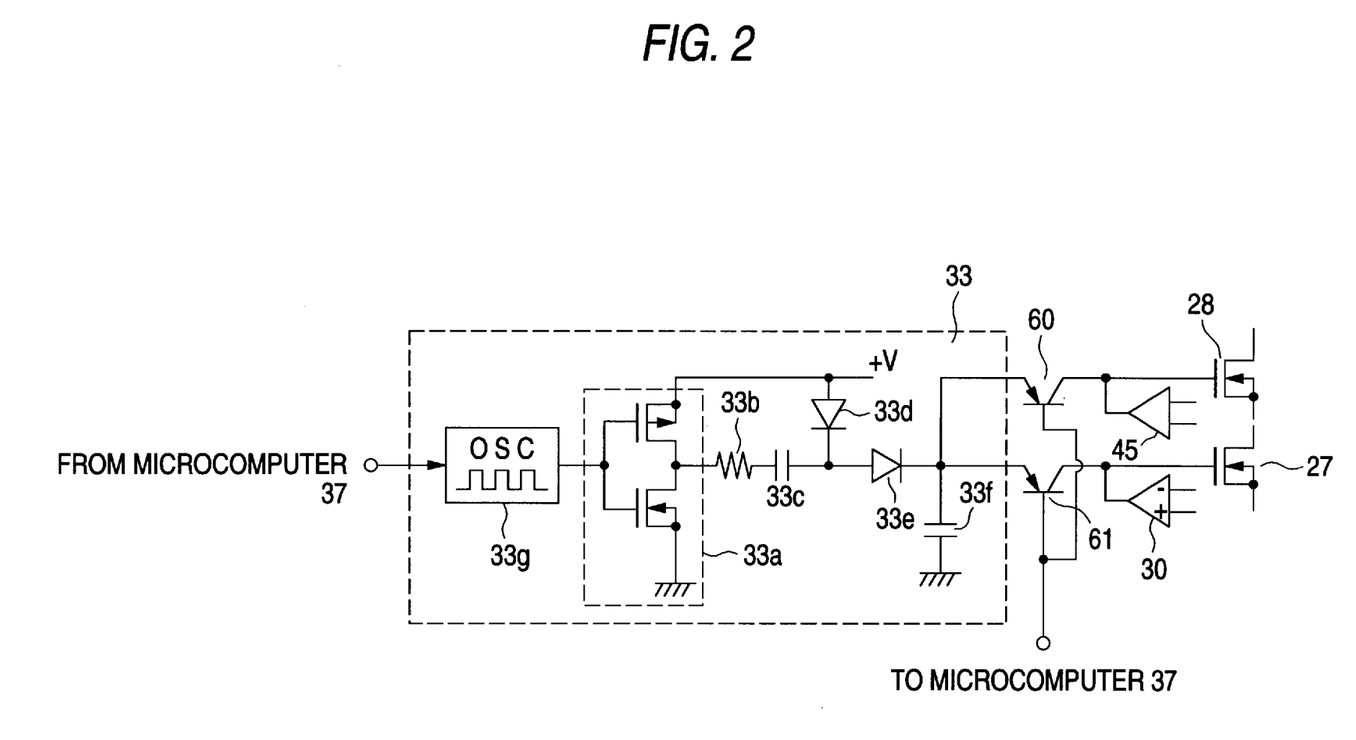
FIG. 2 is a detailed circuit diagram showing a charge pump circuit shown in FIG. 1.

Next, the charge pump circuit 33 will be described in detail with reference to FIG. 2.

The charge pump circuit 33 includes a voltage doubler rectifier circuit made up of an oscillator 33g, an invertor 33a, diodes 33d and 33e, capacitors 33c and 33f, and a resistor 33b. A microcomputer 37 which will be described later supplies a trigger signal which is high in, for example, the case where the power is turned on, to the oscillator 33g. Only when the trigger signal is supplied, the charge pump circuit 33 generates a voltage which is double the power source voltage (+V), so as to make the gate voltages of the first and second field effect transistors 27 and 28 higher than the drain voltages, thereby driving the transistors.

The current detection resistor 29, the comparator 30, the constant current source 31, the resistor 32, and the charge pump circuit 33 constitute bias control means for controlling the gate potentials of the first and second field effect transistors 27 and 28.

Reference numerals 34 and 49 designate squibs. One end of the squib 34 is connected to the output of the squib control circuit 23, and the other end thereof is grounded via a series circuit of a counterflow preventing diode 35 and an acceleration switch 51. One end of the other squib 49 is connected to the output of the squib control circuit 24, and the other end thereof is grounded via a series circuit of a counterflow preventing diode 50 and the acceleration switch 51. Reference numeral 37 designates a microcomputer that judges the condition of an accident on the basis of a deceleration signal output from an acceleration sensor 38 for detecting a crash of the vehicle. If it is judged that the air bags or the like are to operate, trigger signals are output simultaneously or with a time lag to the charge pump circuits 33 and 48, respectively.

Next, only the charge pump circuit 33 will be described with reference to FIG. 2.

As described above, the charge pump circuit 33 is basically configured by the voltage doubler rectifier circuit. The input terminal of the oscillator 33g is connected to the output terminal of the microcomputer 37. The invertor 33a is driven by the oscillation output of the oscillator. In the charge pump circuit 33, the resistor 33b, the capacitor 33c, and the first counterflow preventing diode 33d are connected in series between the output terminal of the invertor 33a and the power source (+V), and the second counterflow preventing diode 33e is connected between the junction of the capacitor 33c and the first counterflow preventing diode 33d and the output terminal of the charge pump circuit 33. The capacitor 33f is connected between the output terminal and the ground. The trigger signal is supplied from the microcomputer 37. When the output of the oscillator 33g is changed in level, for example, ten times, the charge pump circuit 33 outputs a voltage which is double the power source voltage (+V).

When the first and second field effect transistors 27 and 28 are to be driven by the charge pump circuit 33 of the type described above, the switch circuit 61 is necessary. The switch circuit 61 is a switch circuit configured by a switching transistor. Only when a trigger signal of a low level is supplied from the microcomputer 37, the switch circuit 61 is in the turn-on state so that the doubled voltage is supplied from the charge pump circuit 33 to the gates of the first and second field effect transistors 27 and 28.

The function of the configuration described above will be described.

(a) When the device is powered on, the microcomputer 37 supplies the trigger signal of a high level to the oscillator 33g. During only the period when the trigger signal is supplied, the oscillator 33g operates continuously so that the second capacitor 33f is always charged, thereby causing the charge pump circuit 33 to output the doubled voltage.

(b) When the microcomputer 37 does not output the on signal (corresponding to the squib firing signal in FIG. 7) to the switch circuit 61, the switching transistor of the switch circuit 61 is turned off. Consequently, the first and second field effect transistors 27 and 28 are kept to be in the turn-off state.

(c) By contrast, when the microcomputer 37 outputs the on signal to the switch circuits 60 and 61, the switching transistor of the switch circuit 61 is turned on. Consequently, a voltage signal which is higher than the potentials of the sources of the first and second field effect transistors 27 and 28 is supplied to the gates of the transistors 27 and 28. As a result, the first and second field effect transistors 27 and 28 start to operate in the active region. Therefore, the squib firing current begins to flow through the squib 34 via the first field effect transistor 27. The amount of the current at this time is detected in the form of a voltage from the current detection resistor 29. When the potential of the inverting (−) input terminal of the comparator 30 becomes higher than the reference voltage, the state of the output terminal is switched to the low-level state. This causes the gate potentials of the first and second field effect transistors 27 and 28 to be lowered, so that the transistors 27 and 28 are disposed to transfer to the turn-off state. It is a matter of course that the acceleration switch 51 is assumed to be in the turn-on state at this time.

When the first and second field effect transistors 27 and 28 approach the turn-off state, however, the voltage of the upstream side of the resistor 29 is lowered. When the voltage becomes lower than the reference voltage of the comparator 30, the output of the comparator 30 is made high so that the output voltage of the charge pump circuit 33 is again output via the switch circuit 61, whereby the gate voltages are raised. Consequently, the gate potentials of the first and second field effect transistors 27 and 28 are raised and hence the states of the transistors are transferred toward the state where the transistors are turned on in the active region. Hereinafter, during a period when the switch circuit 61 is turned on, the above-mentioned operation is repeated so that a constant current flows through the first field effect transistor 27. As a result, a constant current is supplied to the squib 34.

In the above, only the operation of the squib control circuit 23 has been described. The other squib control circuit 24 operates in the same manner as described above.

(Second Embodiment)

Figure 3:
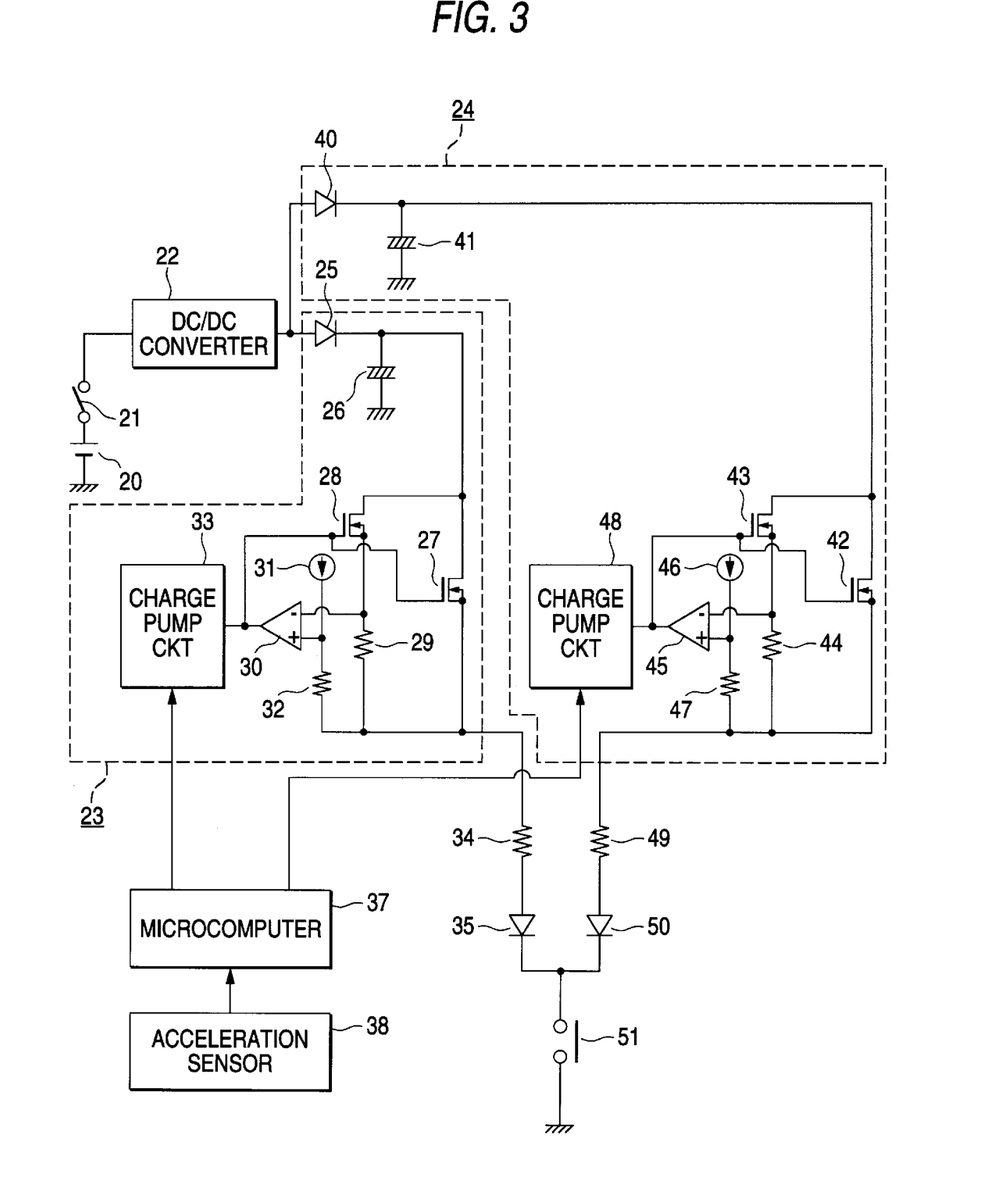
FIG. 3 is a circuit diagram showing an occupant crash protection device for a vehicle in accordance with a second embodiment of the invention.

In the embodiment, the switch circuits 60 and 61 and the capacitor 33f of the squib control circuits 23 and 24 in FIG. 1 are removed away, a charge pump circuit is disposed in each of the squib control circuits 23 and 24, and, in response to the input of an on signal (corresponding to the squib firing signal in FIG. 2), the operation is started (see FIG. 3).

In the above-described embodiment, plural sets of the first and second field effect transistors 27 and 42, and 28 and 43 are driven by using the capacitor 33f disposed in the single charge pump circuit 33, and the switch circuits 60 and 61 as external circuits. By contrast, in the embodiment shown in FIG. 4, a stray capacity formed between the gate and source of each of the first and second field effect transistors 27 and 28 is used in place of the capacitor 33f, and a charge pump circuit 33 is configured for each of the first and second field effect transistors 27 and 42, so that the switch circuits 60 and 61 can be eliminated. Therefore, all the components can be incorporated in a chip of an integrated circuit. Accordingly, the embodiment can be configured in the form of a circuit suitable for an integrated circuit.

(Third Embodiment)

Figure 4:
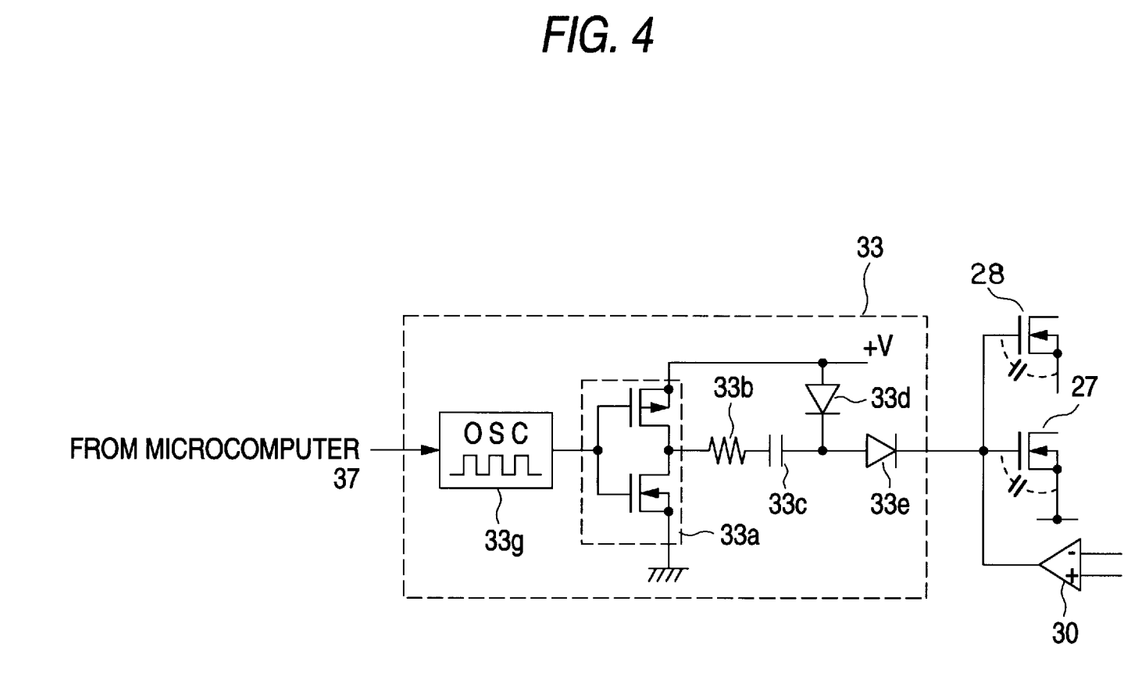
FIG. 4 is a detailed circuit diagram showing another structure of a charge pump circuit shown in FIG. 3.
Figure 5:
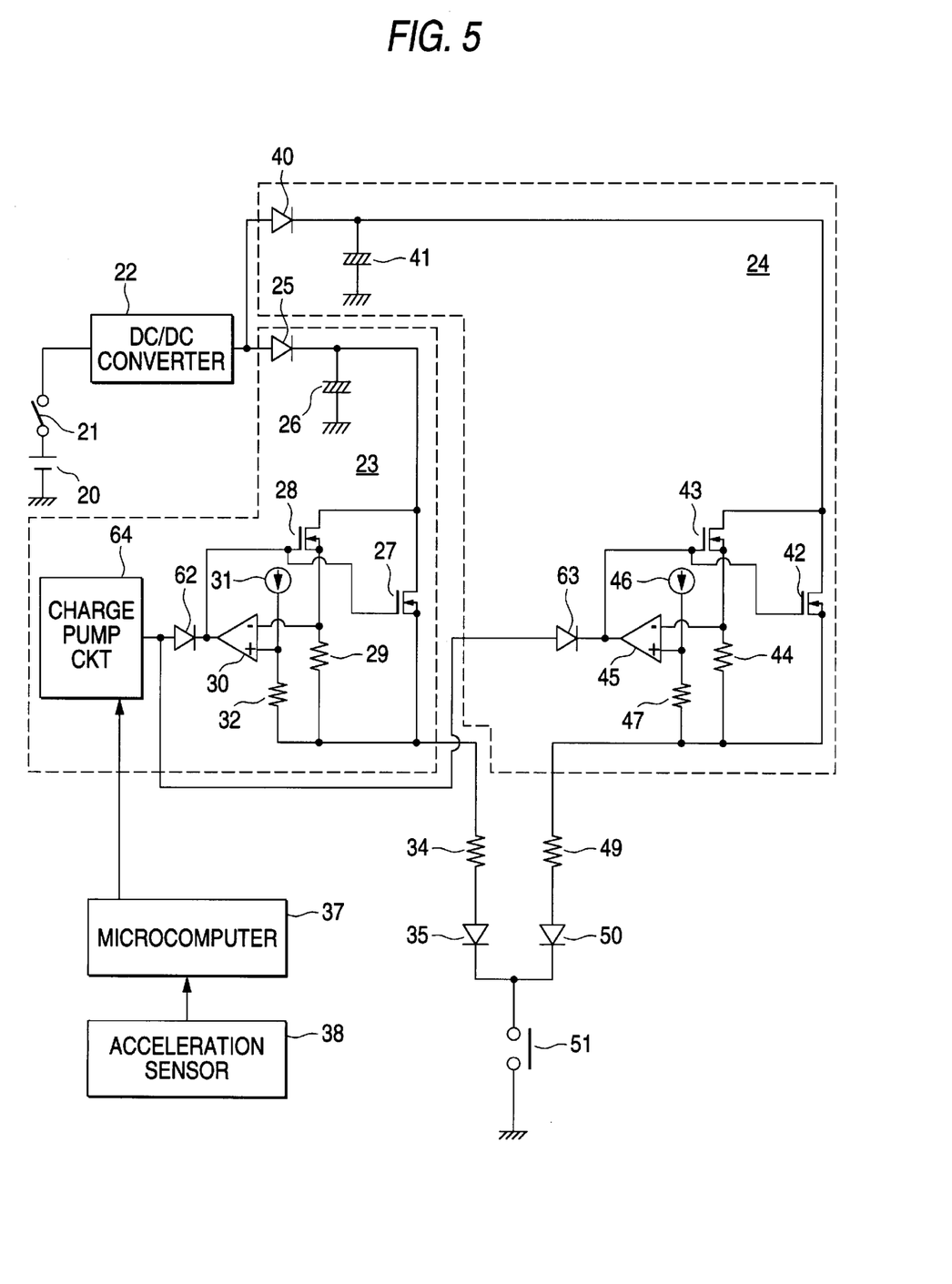
FIG. 5 is a circuit diagram showing an occupant crash protection device for a vehicle in accordance with a third embodiment of the invention.

As shown in FIG. 5, in the embodiment, the switch circuits 60 and 61 in both the squib control circuits 23 and 24 in FIG. 1 are replaced with counterflow preventing diodes 62 and 63. With respect to a signal line from the microcomputer 37 to a charge pump circuit 64, the connection of the signal line from the microcomputer 37 to the charge pump circuit 33 in FIG. 1 is eliminated, and signal lines from the microcomputer 37 to the charge pump circuits 60 and 61 are connected in place of the signal line. In the embodiment, the circuit shown in FIG. 4 is used as the charge pump circuit 64. According to this configuration, the costs of the parts can be reduced and one port of the microcomputer 37 can be saved.

Figure 6:
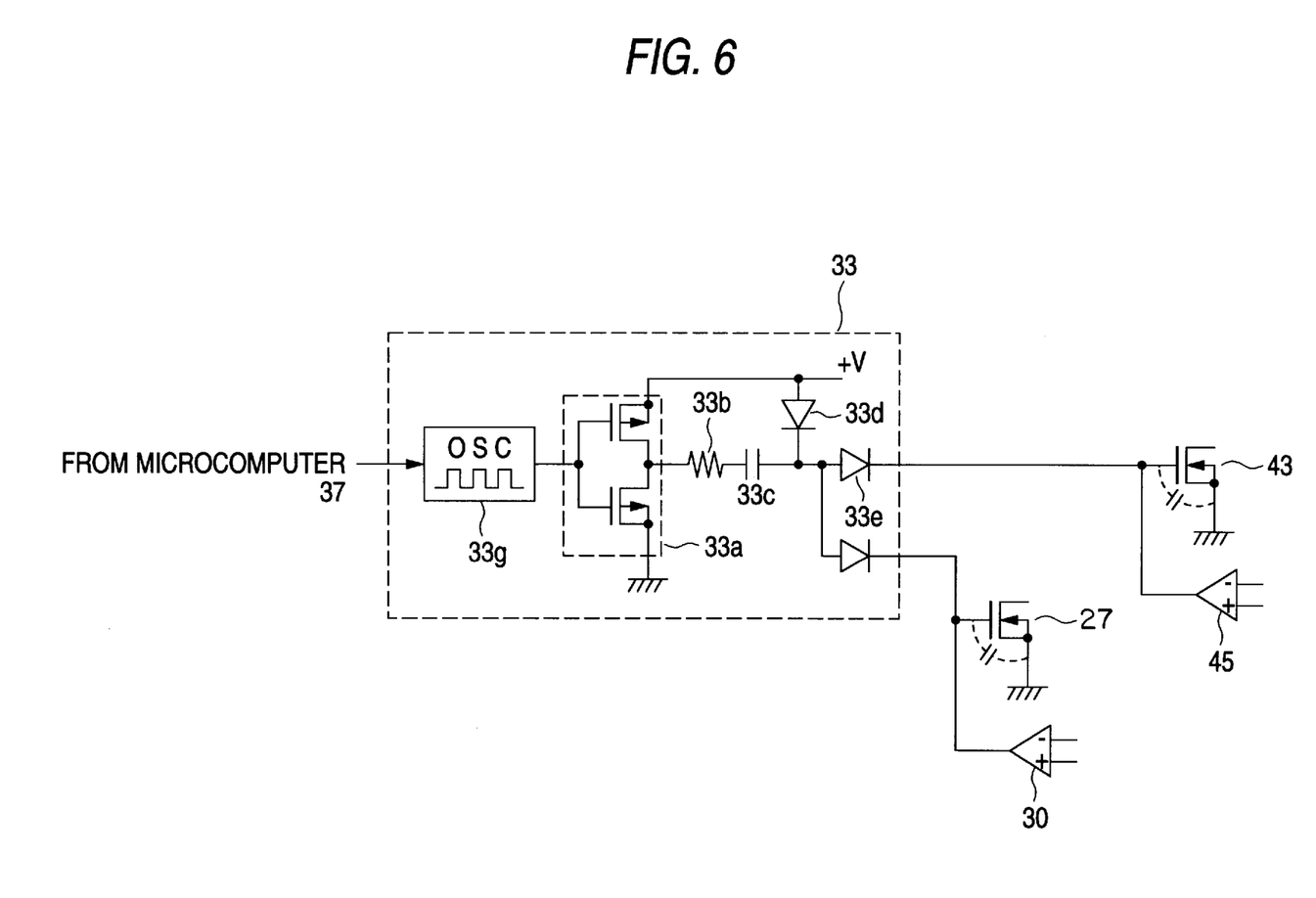
FIG. 6 is a detailed circuit diagram showing a charge pump circuit shown in FIG. 5.

In the third embodiment, the circuit shown in FIG. 4 is used as the charge pump circuit 64. Alternatively, as shown in FIG. 6, another counterflow preventing diode 33e which is identical with the counterflow preventing diode 33e of the charge pump circuit 33 in FIG. 4 may be connected so that the anodes of the diodes are commonly connected, the cathode of one of the counterflow preventing diodes 33e may be connected to the junction of the comparator 30 and the gate of the first field effect transistor 28, and the cathode of the other counterflow preventing diode 33e may be connected to the junction of a comparator 45 and the gate of the first field effect transistor 43. In this case, the counterflow preventing diode 62 shown in FIG. 5 corresponds to the counterflow preventing diode 33e shown in FIG. 6, and the other counterflow preventing diode 63 corresponds to the other counterflow preventing diodes 33e shown in FIG. 6.

As described above, according to the invention, since the circuit components of the squib control circuit except the first field effect transistor can be formed by elements of low power consumption, the effect that the squib control circuits 23 and 24 except for the counterflow preventing diode 40, the backup capacitor 41, the counterflow preventing diode 25, and the backup capacitor 26 can be easily integrated into an IC and the cost can be reduced is attained. In the case where a configuration in which a sole charge pump circuit is used in place of two charge pump circuits is employed as shown in the first and third embodiments, it is a matter of course that it is possible to attain an effect that, even when charge pump circuits are different in property from each other, a problem due to the difference in property among charge pump circuits is not produced.

Figure 8A:
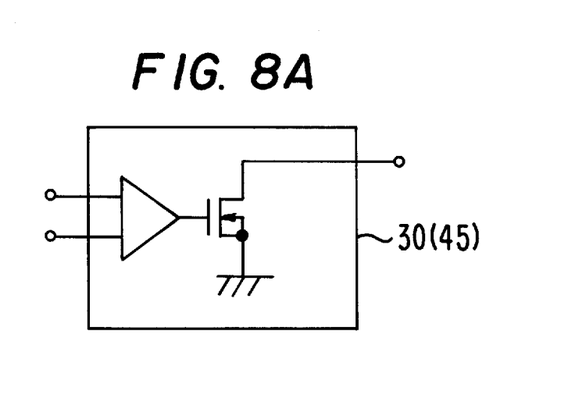
FIG. 8A is a diagram showing an open drain output type comparator used in the circuits shown in FIGS. 1, 3 and 5.
Figure 8B:
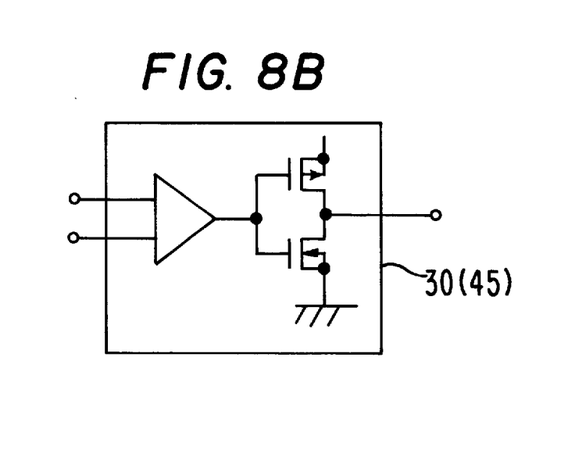
FIG. 8B is a diagram showing a push-pull type comparator used in the circuits shown in FIGS. 1, 3 and 5.

The comparators 30 and 45 used in the above-described embodiments shown in FIGS. 1, 3 and 5 are, for example, of the open drain output type comparator shown in FIGS. 8A or the push-pull type comparator shown in FIG. 8B. These types of comparators 30 and 45 can be arbitrarily selected.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An occupant crash protection device for a vehicle, comprising:

an acceleration sensor for detecting a crash of the vehicle to output a deceleration signal a microcomputer for judging that an accident happens according to the deceleration signal outputted from said acceleration sensor and for outputting a trigger signal when judging that the accident happens;

a current limiting circuit which receives a trigger signal generated from said microcomputer when said microcomputer judges that the accident happens, for controlling a squib firing current to be a constant value;

a squib;

an acceleration switch; and a direct current power source having two terminals between which said current limiting circuit, said squib and said acceleration switch are connected in series;

wherein said current limiting circuit comprises:

a first n-channel field effect transistor which is connected in series to said squib;

a second n-channel field effect transistor which is connected in parallel to said first n-channel field effect transistor and which receives a minute amount of a current obtained by shunting the squib firing current that flows through said first n-channel field effect transistor; and bias control means for, in synchronization with the squib firing current, comparing the amount of the current flowing through said second n-channel field effect transistor with a reference value to control a gate voltage so that the amount of the current flowing through said first n-channel field effect transistor has an amount proportional to the reference value.

2. An occupant crash protection device as claimed in claim 1, wherein the major portion of the squib firing current to be supplied to said squib flows through said first n-channel field effect transistor, and the remaining minute current thereof flows through said second n-channel field effect transistor.

3. An occupant crash protection device as claimed in claim 1, wherein said bias control means includes a current detection resistor having a small allowable power, which is connected in series to said second n-channel field effect transistor.

4. An occupant crash protection device as claimed in claim 1, wherein said bias control means includes a charge pump circuit that generates, when receiving the trigger signal from said microcomputer, a voltage which is double a power source voltage to make the gate voltages of the first and second field effect transistors higher than the drain voltages to drive said first and second field effect transistors.

* * * * *